United States Patent [19]
Krein et al.

[11] Patent Number: 5,630,077
[45] Date of Patent: May 13, 1997

[54] SYSTEM AND METHOD FOR COORDINATING ACCESS TO A BUS

[75] Inventors: William T. Krein, San Jose; Charles M. Flaig, Cupertino; James D. Kelly, Aptos, all of Calif.

[73] Assignee: Apple Computer, Inc., Cupertino, Calif.

[21] Appl. No.: 626,905

[22] Filed: Apr. 4, 1996

Related U.S. Application Data

[63] Continuation of Ser. No. 186,169, Jan. 25, 1994, abandoned.
[51] Int. Cl.$^6$ ..................................................... G06F 13/00
[52] U.S. Cl. ........................... 395/293; 395/285; 395/729
[58] Field of Search ..................................... 395/287, 293, 395/729

[56] References Cited

U.S. PATENT DOCUMENTS

| | | | |
|---|---|---|---|
| 4,038,644 | 7/1977 | Duke et al. | 395/287 |
| 4,669,079 | 5/1987 | Blum | 370/85.6 |
| 5,081,576 | 1/1992 | Ward | 395/325 |
| 5,253,347 | 10/1993 | Bagnoli et al. | 395/325 |
| 5,313,641 | 5/1994 | Simcoe et al. | 395/725 |

FOREIGN PATENT DOCUMENTS

| | | | |
|---|---|---|---|
| 0369264 | 5/1990 | European Pat. Off. | |
| 9303439 | 2/1993 | WIPO | |

*Primary Examiner*—Jack B. Harvey
*Assistant Examiner*—David A. Wiley
*Attorney, Agent, or Firm*—Bobby K. Truong; Greg T. Sueoka

[57] ABSTRACT

To optimize system bus utilization in a computer system, a bus coordinator is included in the computer system to coordinate the transfer of information signals on the bus. Each time a source node wishes to transfer information to a destination node, the source node sends a request to the coordinator along with the identification of the destination node. Upon receiving this request, the coordinator determines whether the destination node has capacity to receive information signals. If the destination node has capacity, then the coordinator grants control of the system bus to the source node to allow the source node to send information signals to the destination node via the system bus. Otherwise, the source node is denied control of the system bus until the destination node has capacity to receive information signals. By granting control of the system bus to a source node only when the destination node has capacity to receive information signals, the coordinator ensures that no system bus time is wasted on unsuccessful information transfers. Thus, bus utilization is optimized.

10 Claims, 9 Drawing Sheets

SYSTEM AND METHOD FOR COORDINATING ACCESS TO A BUS

RELATED APPLICATIONS

This is a continuation of application Ser. No. 08/186,169 filed on Jan. 25, 1994 now abandoned.

FIELD OF THE INVENTION

This invention relates generally to computer systems and more particularly to a method and system for coordinating access to a bus which optimizes utilization of the bus.

DESCRIPTION OF THE BACKGROUND ART

A typical personal computer (PC) comprises a motherboard including a microprocessor, a system bus, and a plurality of expansion slots for accommodating peripherals such as video cards, sound cards, FAX/modem cards, and the like. The system bus is coupled to both the motherboard and the slots to allow signals to be transferred between the motherboard and the cards, and between the cards themselves. Each slot is considered a "node" and the motherboard may be considered as one or more nodes depending upon the number of devices on the motherboard which are interfaced with the system bus. Because a plurality of nodes are interfaced with the system bus, an accessing scheme is needed to coordinate the transfer of signals between the nodes so that bus contention does not result.

In a typical bus accessing scheme, a node submits a bus request each time it wishes to send information signals via the system bus. This request is processed in accordance with some bus arbitration protocol and, at some time after the submission of the request, the node is granted control of the bus. Once the node has control of the bus, it sends information signals to one of the nodes coupled to the bus and waits for an acknowledgment from the receiving node. There may be certain situations, however, in which the receiving node is unable to complete the desired transaction. For example, the receiving node may have no buffers available for receiving information from the sending node. In such situations, the receiving node sends a "busy" signal to indicate that it cannot complete the transaction. Some accessing schemes at this point implement a "retry" protocol to attempt again to complete the information transfer.

The bus accessing scheme described above wastes bus bandwidth in at least two ways. First, each time information is transferred, the sending node waits for a response from the receiving node. During this waiting period, no useful information is being transferred on the bus. The bus simply sits idly by while the receiving node prepares its response. Second, where a transaction cannot be completed, all of the time spent on the system bus is wasted because no useful information was actually transferred. This leads to inefficient use of valuable bus bandwidth. In most high-end computer systems today, the system bus has already become an information bottleneck. Inefficient use of the bus only exacerbates this problem. Consequently, a need exists for a bus accessing mechanism which optimizes system bus utilization.

SUMMARY OF THE INVENTION

To optimize bus utilization, the present invention provides a bus coordination system which grants control of the bus only to those transaction pairs which can complete the transaction. The system of the present invention preferably comprises a bus, at least one source node, at least one destination node, and a bus coordinator. Each time a source node has information to send to a destination node, it sends a bus request and the identification (ID) of the destination node to the coordinator. In response, the coordinator determines whether the specified destination node has capacity to receive information signals. This determination is preferably made by checking the status of a "capacity" signal provided by the destination node. Only if the destination node has capacity to receive information signals will the coordinator grant control of the bus to the source node. In this manner, the coordinator ensures, before granting control of the bus to the source node, that the information transfer can be completed. Thus, no bus bandwidth is wasted on unsuccessful transfer attempts.

Once the source node has control of the bus, it sends the desired information to the destination node in the form of an information packet. Since the system of the present invention guarantees that the bus is only granted to those transactions pairs that can complete the transaction, the source node does not need to wait for a response from the destination node. As soon as the information packet is sent, the source node relinquishes control of the bus to allow other nodes to access the bus. This provides for more efficient utilization of the bus. By eliminating the two sources of bandwidth waste (response wait time and unsuccessful transfer time) in the prior art, the present invention provides an improved bus access coordination system.

DETAILED DESCRIPTION OF THE PREFERRED EMBODIMENTS

Figure 1:
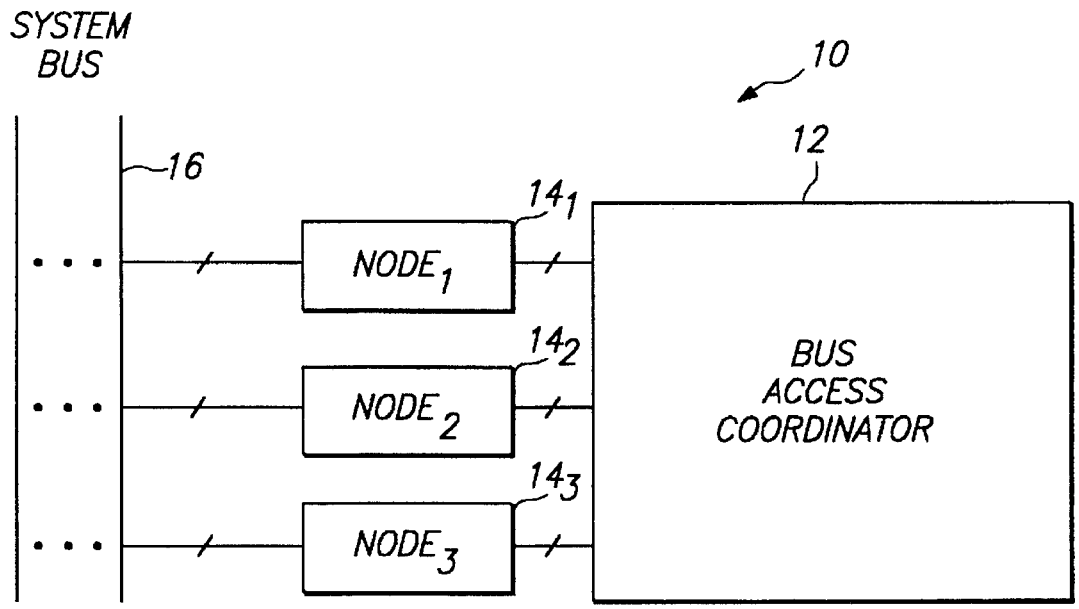
FIG. 1 is a general block diagram representation of the bus access coordination system of the present invention.

With reference to FIG. 1, there is shown a general block diagram of the system 10 of the present invention, wherein the system 10 comprises a bus access coordinator 12, a plurality of nodes 14 coupled to coordinator 12, and a system bus 16 coupled to each of the nodes 14. The system bus 16 carries information signals between the various nodes 14, and the bus coordinator 12 controls which node has access to the bus 16 and when. For the sake of simplicity, system 10 is shown in FIG. 1 as having only three nodes 14, but it should be understood that the system 10 may comprise any desired number of nodes. System 10 is most effective when implemented in a computer system to control access to the system bus, but it should be noted that system 10 may be employed in any system wherein a plurality of nodes share a common bus.

The system 10 of the present invention is grounded upon the basic principle that control of the system bus 16 should be granted to a particular node only if it is determined that the information transfer contemplated by that node can be completed. That is, before granting the bus 16 to a requesting or source node to allow the source node to send information to a destination node, the coordinator 12 first makes sure that the destination node has capacity to receive the information signals. Only if the destination source has this capacity will the coordinator 12 grant the bus 16 to the source node. By doing this, coordinator 12 ensures that no bus time will be wasted on unsuccessful transfers. This, in turn, improves bus utilization efficiency and eliminates the need for any type of "retry" protocol. By eliminating the need for any type of "retry" protocol, the bus 16 can be made unidirectional, which allows the bus 16 to be run at higher speeds. With this principle in mind, system 10 will now be described in greater detail.

In system 10, each of the nodes 14 represents a port or a device which is coupled to the bus 16. A node may be a peripheral such a video card, a sound card, an ethernet card or the like plugged into an expansion slot of a computer system, or a node may be some device found on the motherboard of the computer system. Each node 14 may be a source node which sends information signals to another node, a destination node which receives information signals from other nodes, or a bilateral node which can both send and receive information signals to and from other nodes. For the sake of illustration, it will be assumed herein that each of the nodes 14 in FIG. 1 is a bilateral node.

In order to cooperate properly with bus coordinator 12, each of the nodes 14 needs to implement the same protocol as the coordinator 12. Accordingly, each node 14 preferably comprises a destination interface (not shown) coupled to coordinator 12 for controlling the reception of information from other nodes, and a source interface (not shown) coupled to coordinator 12 for controlling the transmission of information to other nodes. These interfaces interact with coordinator 12 to properly carry out the reception and transmission of information signals. In the preferred embodiment, these two interfaces are implemented by way of state machines, but if desired, these interfaces may be implemented by way of software or other equivalent means. An operational flow diagram for the destination interface state machine is shown in FIG. 2, and an operational flow diagram for the source interface state machine is shown in FIG. 3.

Figure 2:
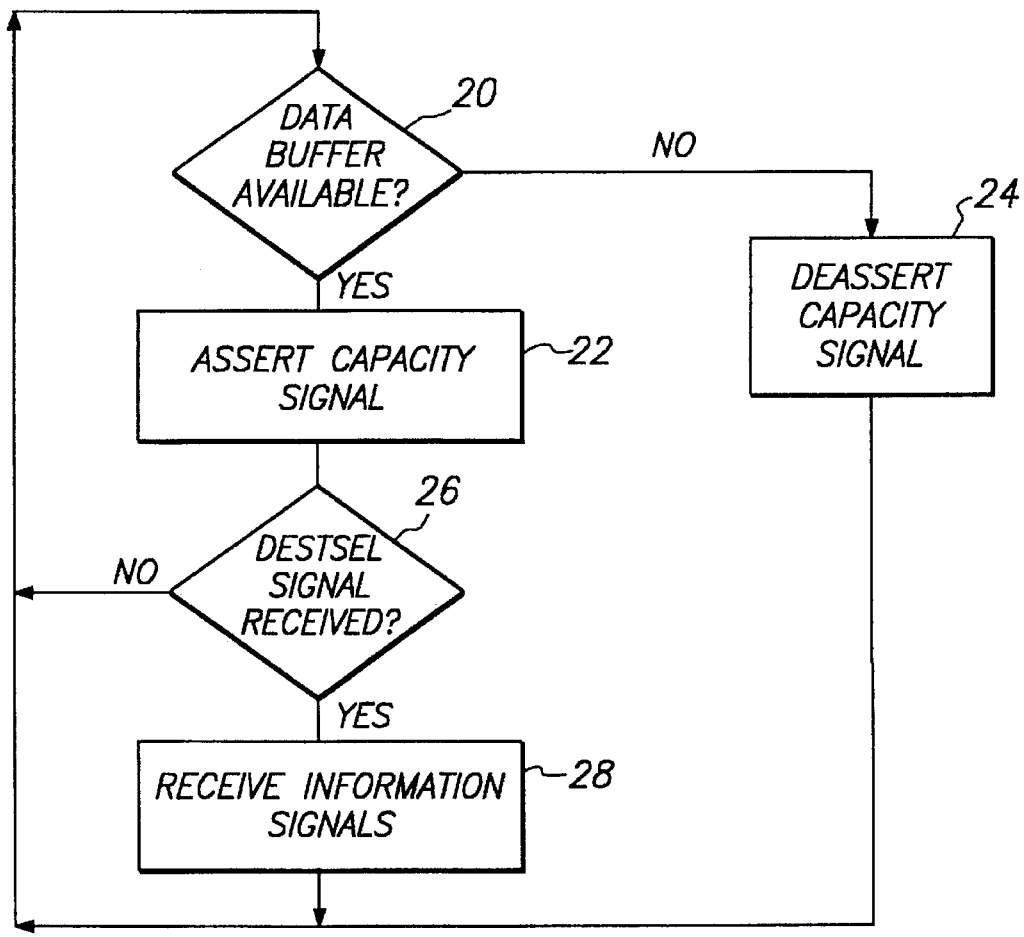
FIG. 2 is an operational flow diagram for the destination interface state machine of each node 14 in FIG. 1.

With reference to FIG. 2, the destination interface state machine is primarily responsible for controlling the status of a "capacity" signal. Recall from the discussion above that coordinator 12, before granting the bus 16 to a source node, determines whether the destination node has capacity to receive information signals. Coordinator 12 makes this determination by checking the status of the capacity signal provided by the destination node. If the capacity signal is asserted, then the coordinator 12 can grant the bus to the source node to allow the desired information transfer to occur. Otherwise, the source node must wait until the destination node has capacity. Consequently, the capacity signal plays an important role in coordinating access to the bus 16. The destination interface state machine determines the state of the capacity signal by checking 20 a data buffer (not shown) associated with a particular node. If the data buffer has storage space available for receiving information signals, then the destination interface asserts 22 the capacity signal to indicate that the node has capacity to receive information signals. Otherwise, the capacity signal is deasserted 24 to preclude information signals from being sent to the node. Where the capacity signal is asserted, the destination interface goes further to determine 26 whether a destination select (DestSel) signal has been received from the coordinator 12. This DestSel signal indicates to the node that the coordinator has granted the bus 16 to a source node and that information from that source node is forthcoming on the bus 16. In response to the DestSel signal, the destination interface receives 28 the information on the bus 16 and loops back to update the status of the capacity signal.

Figure 3:
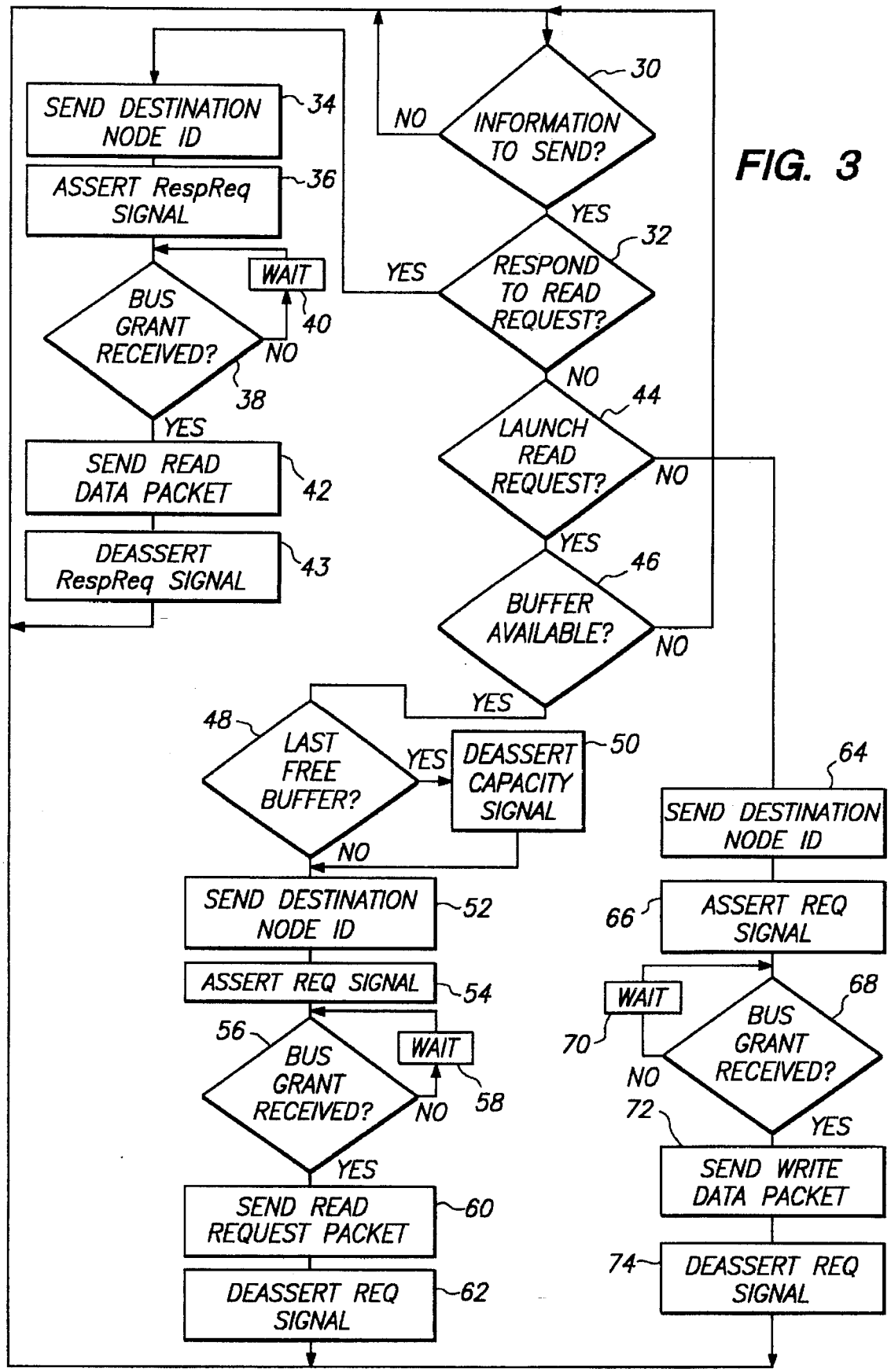
FIG. 3 is an operational flow diagram for the source interface state machine of each node 14 in FIG. 1.

Referring now to FIG. 3, the source interface state machine controls the transmission of information signals from a source node. There are basically three instances in which a node may wish to send information signals on the bus 16: (1) the node has write data to send to a destination node; (2) the node wishes to launch a read request to obtain read data from another node; and (3) the node has read data to send in response to a read request from another node. The source interface state machine handles these three situations in the manner depicted in FIG. 3. The source interface operates by first determining 30 whether the node has any information to send. If not, the interface continuously cycles until there is information to send. Where there is information to send, the source interface determines 32 whether the information is being sent in response to a request for read data. If so, the source interface generates and sends 34 the identification (ID) of the requesting node to the coordinator 12, and also asserts 36 its response request (RespReq) signal to indicate to the coordinator 12 that it wants control of the bus 16. Thereafter, the interface waits 38, 40 for a bus grant control signal from the bus coordinator 12. When the bus grant signal is received, the interface sends 42 the requested read data (preferably in the form of a read data packet) onto the bus 16, and when transmission of the information is completed, the interface deasserts 43 the RespReq signal to relinquish control of the bus 16. An important point to note here is that control of the bus 16 is relinquished by the source interface as soon as data transmission is completed. The interface does not retain control of the bus to await a response from the destination node. Such a response is not necessary in system 10 because bus coordinator 12 guarantees that all information transfers on the bus 16 will be completed. The source interface would not have been granted the bus otherwise. Therefore, the system 10 of the present invention eliminates the response wait time present in the prior art bus accessing systems.

Referring again to step 32, where information is not being sent in response to a request for read data, the source interface determines 44 whether the node wishes to launch a read request or to send write data to a destination node. If a read request is desired, the interface checks 46 for the availability of a data buffer. Whenever a read request is launched, the source interface knows that a read data packet will be forthcoming from the node from which data is requested. To anticipate the arrival of the read data packet, the source interface makes sure, before launching the read request, that a data buffer is available for receiving the data packet. If no data buffer is currently available, a read request cannot be launched and thus, the interface loops back to step 30. But if a data buffer is available, the interfaces determines 48 whether the buffer is the last free buffer associated with the source node. If it is the last free buffer, the source interface deasserts 50 the capacity signal from the node. By so doing, the source interface indicates to the bus coordinator 12 that the node cannot currently be a destination for a regular information transfer but only for a read response transfer. As will be elaborated upon later, the coordinator 12 does not check the status of the capacity signal when processing a read response. Thus, by deasserting the capacity signal, the source interface prevents the last buffer from being filled by other incoming data before the read data packet is received.

The source interface is now ready to launch its read request. To do so, the interface generates and sends 52 to the bus coordinator 12 the identification (ID) of the destination node. This ID is important because it tells the coordinator 12 which node is the intended destination. This ID allows the coordinator 12 to check the capacity signal of a specific node to determine whether that node has capacity to receive information signals. After sending the destination node ID, the source interface asserts its request (Req) 54 signal to indicate to the coordinator 12 that it wants control of the bus. The interface then waits 56, 58 until a bus grant signal is received from the coordinator. When the bus grant signal is received, the read request is sent 60 onto the bus 16 (preferably in the form of a read request packet), and as soon as the request is completely sent, the Req signal is deasserted 62 so that control of the bus 16 is relinquished. No bus time is wasted on waiting for a response from the destination node.

The process for sending write data is substantially the same as that for sending a read request. The only difference is that in sending write data, no check is performed on the buffers associated with the source node. Such a check is not necessary since no return data packet is anticipated. To send write data, therefore, the source interface generates and sends 64 the ID of the destination node to the coordinator 12. Thereafter, the interface asserts 66 the Req signal and waits 68, 70 for a bus grant signal from coordinator 12. Once the bus grant signal is received, the interface sends 72 the write data (preferably in the form of a write data packet) onto the bus 16, and when data transmission is completed, the interface deasserts 74 the Req signal to relinquish control of the bus. Again, no bus time is wasted on waiting for a response from the destination node. Information is thus transmitted on the bus 16 by the source interface of a node.

Figure 4:
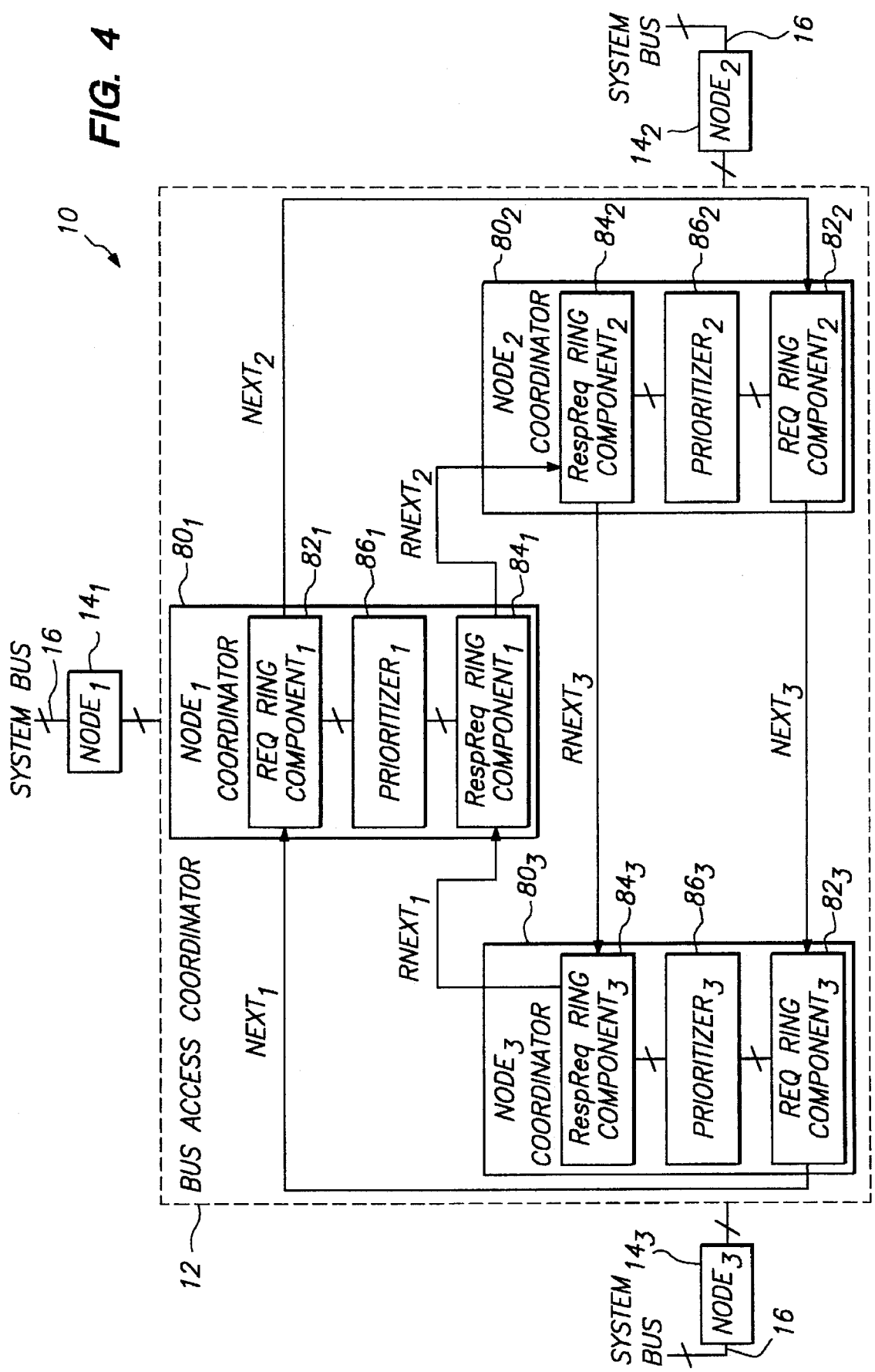
FIG. 4 is a block diagram of the system of the present invention illustrating the node coordinators 80 corresponding to each of the nodes 14.

The node interfaces have been fully described. With reference to FIG. 4, the bus access coordinator 12 will now be described in greater detail. The coordinator 12 preferably comprises a plurality of node coordinators 80, each node coordinator 80 corresponding to one of the nodes 14 in the system 10. In the system of FIG. 4, there are three nodes $14_1$–$14_3$, thus, coordinator 12 preferably comprises three node coordinators $80_1$–$80_3$, node coordinator $80_1$ corresponding to $node_1$ $14_1$, node coordinator $80_2$ corresponding to $node_2$ $14_2$, and node coordinator $80_3$ corresponding to $node_3$ $14_3$. For systems having more nodes, more node coordinators may be included in the bus access coordinator 12. Each node coordinator 80 is responsible for controlling the granting of the system bus 16 to its corresponding node 14.

Figure 5A:
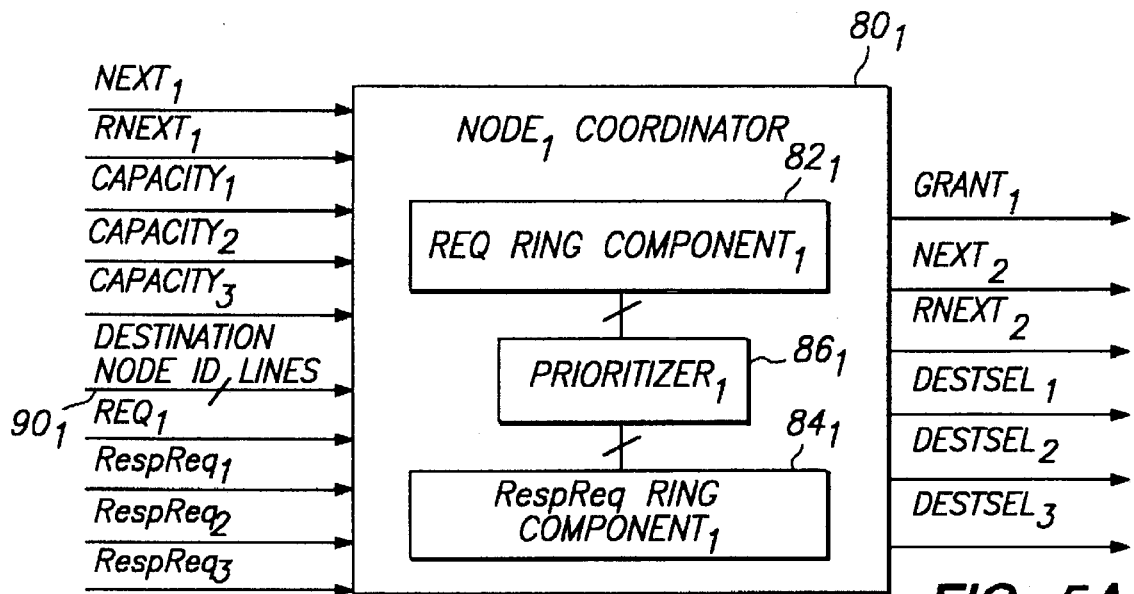
FIGS. 5a–5c are block diagrams showing the inputs and outputs of the node coordinators $80_1$–$80_3$, respectively.

To illustrate more clearly the relationship between a node coordinator and a corresponding node, reference is made to FIG. 5a, wherein a block diagram is provided of the $node_1$ coordinator $80_1$ showing the coordinator's inputs and outputs. Because coordinator $80_1$ corresponds to $node_1$ $14_1$, it receives several specific inputs from $node_1$ $14_1$. These specific inputs are the node 1 request signal $Req_1$ and the $node_1$ destination node ID lines $90_1$. In addition, coordinator $80_1$ receives inputs common to all of the node coordinators 80 including the capacity signals $capacity_1$–$capacity_3$ from all of the nodes 14, and the response request signals $RespReq_1$–$RespReq_3$ from all of the nodes 14. Furthermore, coordinator $80_1$ receives the $Next_1$ signal and the $RNext_1$ signal from node coordinator $80_3$. As outputs, coordinator $80_1$ provides a bus grant signal $Grant_1$ specific to $node_1$ $14_1$. It is this signal which indicates to $node_1$ $14_1$ whether control of the bus 16 has been granted to it. In addition, coordinator $80_1$ provides output signals that are provided by all of the node coordinators 80, including a Next signal, a Rnext signal, and a destination select signal $DestSel_1$–$DestSel_3$ to each of the nodes $14_1$–$14_3$, respectively. It is through these destination select signals $DestSel_1$–$DestSel_3$ that a destination node is notified of forthcoming information signals on the bus 16.

Figure 5B:
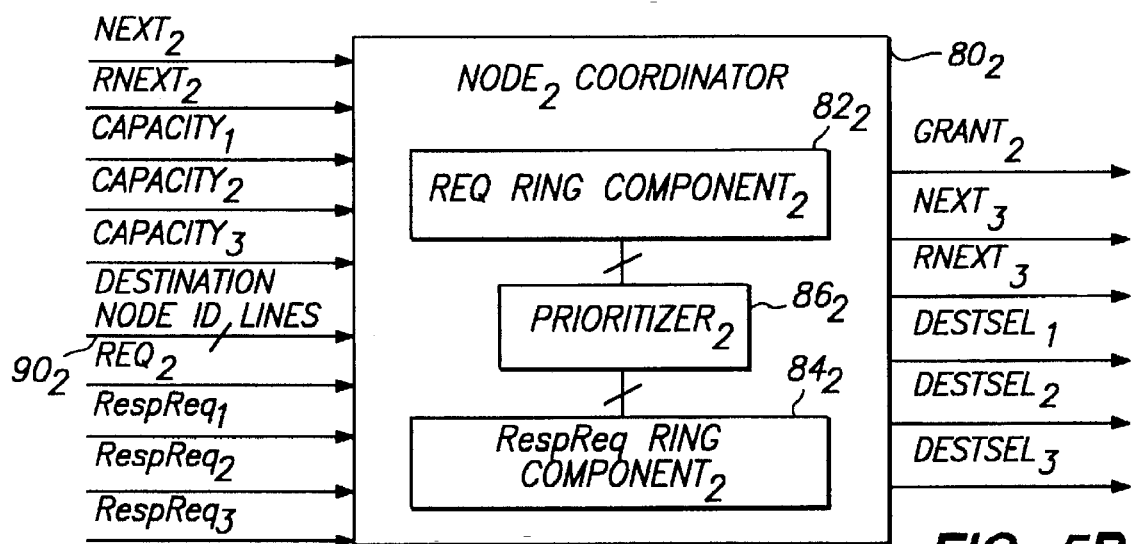
Figure 5C:
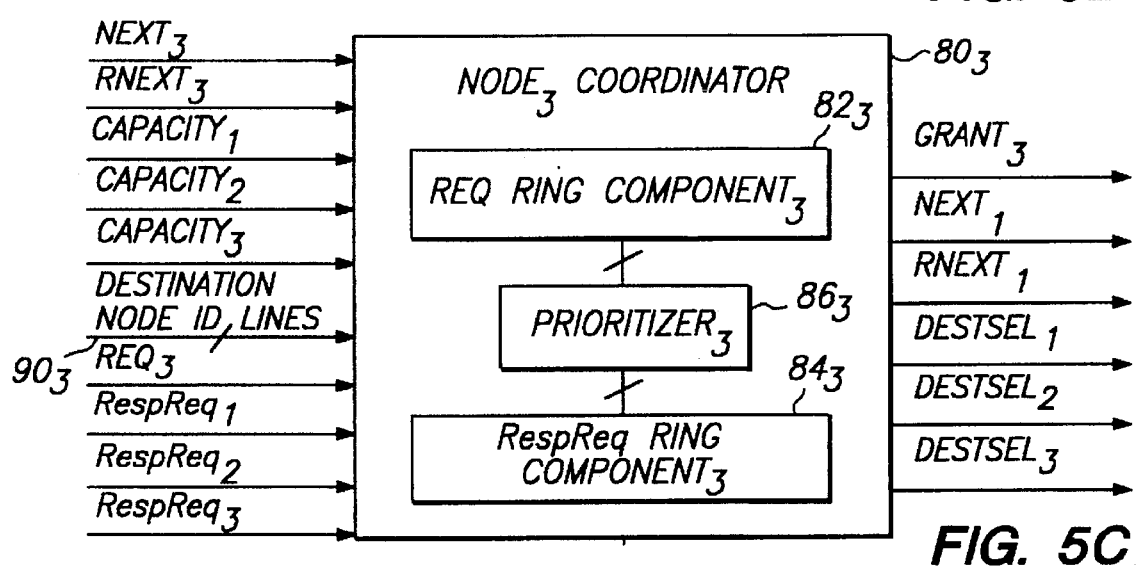

The other node coordinators $80_2$, $80_3$ have very similar inputs and outputs. As shown in FIG. 5b, node coordinator $80_2$, in addition to receiving the common inputs ($capacity_1$–$capacity_3$ and $RespReq_1$–$RespReq_3$) receives the destination ID lines $90_2$ and the request line $Req_2$ from $node_2$ $14_2$, and the $Next_2$ and $RNext_2$ signals from node coordinator $80_1$. As outputs, node coordinator $80_2$ provides a bus grant signal $Grant_2$ specific to $node_2$ $14_2$, as well the other output signals (Next, Rnext, $DestSel_1$–$DestSel_3$). Likewise, as shown in FIG. 5c, node coordinator $80_3$, in addition to receiving the common inputs, receives the destination ID lines $90_3$ and the request line $Req_3$ from $node_3$ $14_3$, and the $Next_3$ and $RNext_3$ signals from node coordinator $80_2$. As outputs, node coordinator $80_3$ provides a bus grant signal $Grant_3$ specific to $node_3$ $14_3$, as well as the other output signals (Next, Rnext, $DestSel_1$–$DestSel_3$). The manner in which the input signals are processed to derive the output signals will be described in a subsequent section.

Referring again to FIG. 4, the node coordinators 80 are preferably connected together in a ring fashion as shown. This ring architecture implements a desirable round-robin fairness scheme which prevents any particular node from monopolizing the bus 16. Note that in FIG. 4, the node coordinators 80 are connected using two separate rings, one ring comprising Req ring components 82 and the other ring comprising RespReq ring components 84. This double ring configuration is made necessary by the fact that bus requests are prioritized in the present invention. To elaborate, there are basically two types of bus requests that can be made in the system of the present invention. The first type is a regular request (Req) which is made when a node wishes to write data or to launch a read request to a destination node, and the second type is a response request (RespReq) which is made when a node sends read data in response to a request from a requesting node. For each response request outstanding, there is a requesting node somewhere in the system waiting for the read data. This waiting period should be minimized in order to maximize throughput. To minimize the read response waiting period, system 10 processes all response requests before processing any regular requests. This prioritization scheme is implemented as shown in FIG. 4 by employing two separate rings and prioritizers 86. One ring $82_1$–$82_3$ handles the regular requests, the other ring $84_1$–$84_3$ handles the response requests, and the prioritizers 86 determine which ring prevails. It should be noted here that the coordinator 12 of the present invention may be implemented using a single ring of node coordinators 80 with no prioritization scheme. However, because prioritization provides significantly improved performance, the double ring structure is preferred.

The preferred structure for each of the node coordinators 80 is shown FIGS. 6a–6c, FIGS. 7a–7c, and FIGS. 8a–8c.

Figure 6A:
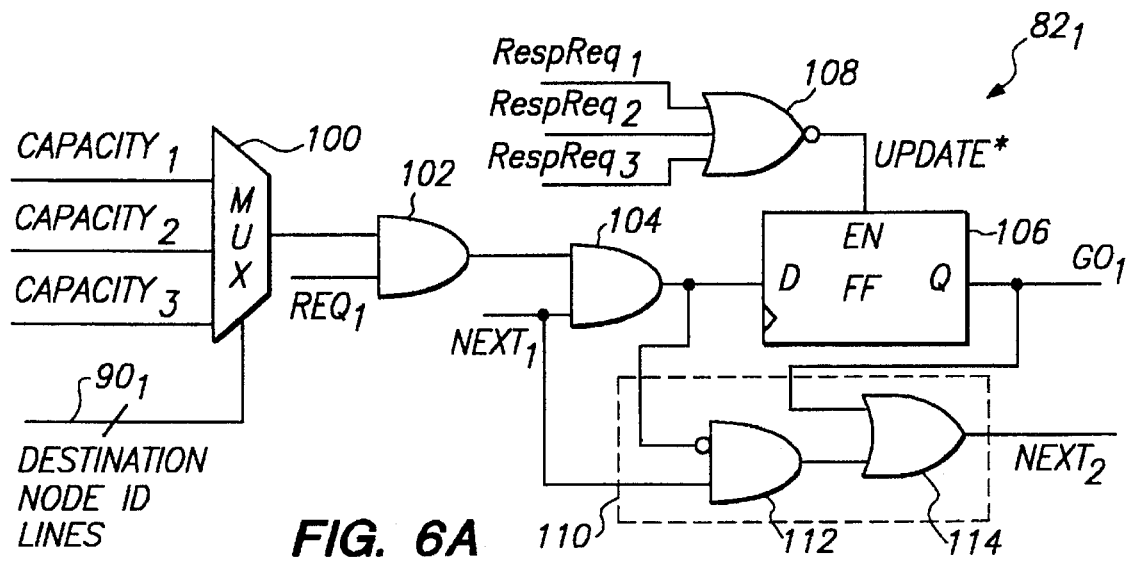
FIGS. 6a–6c are circuit diagrams of the Req ring components $82_1$–$82_3$, respectively.
Figure 6B:
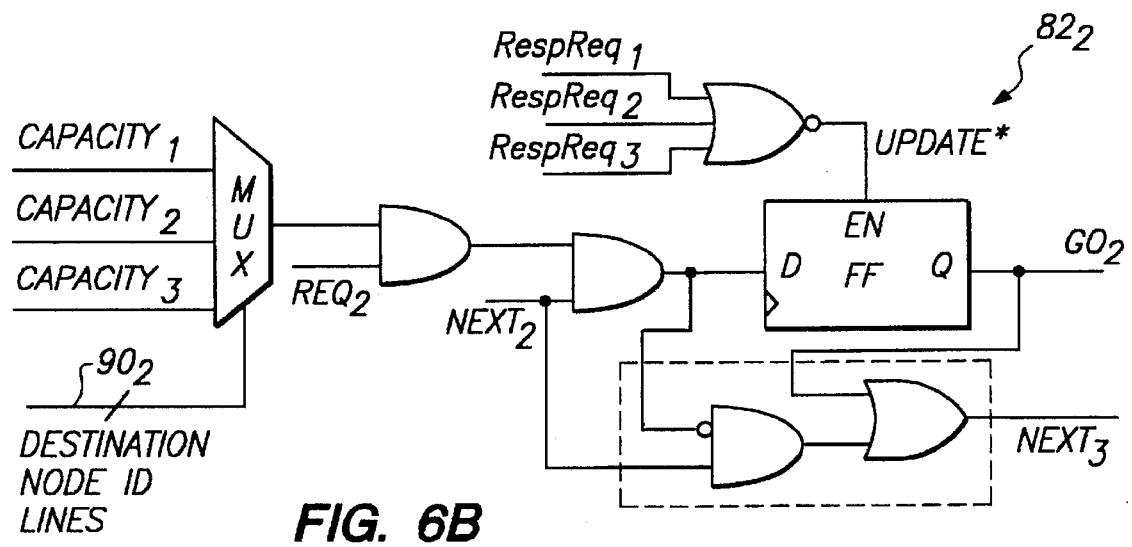
Figure 6C:
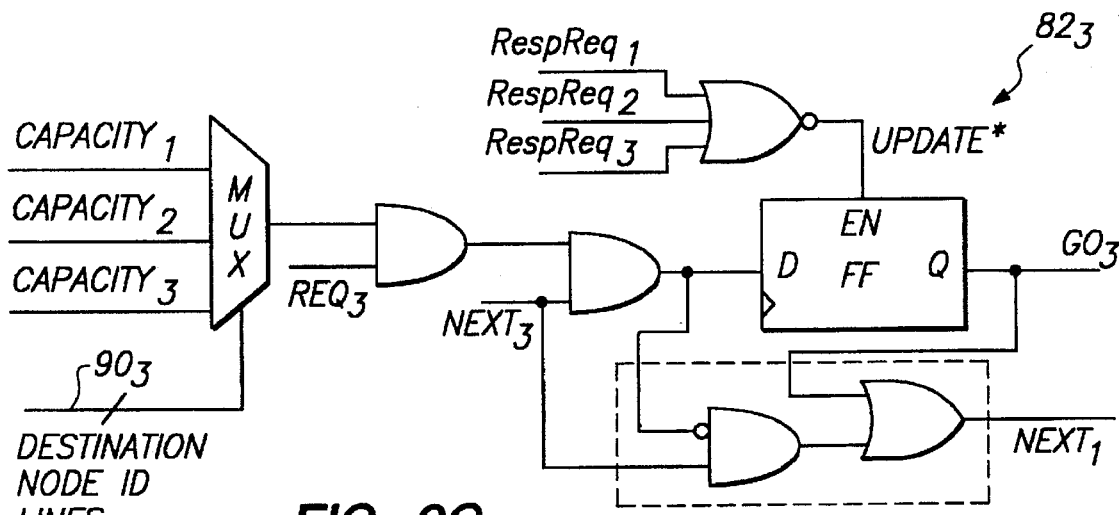
Figure 7A:
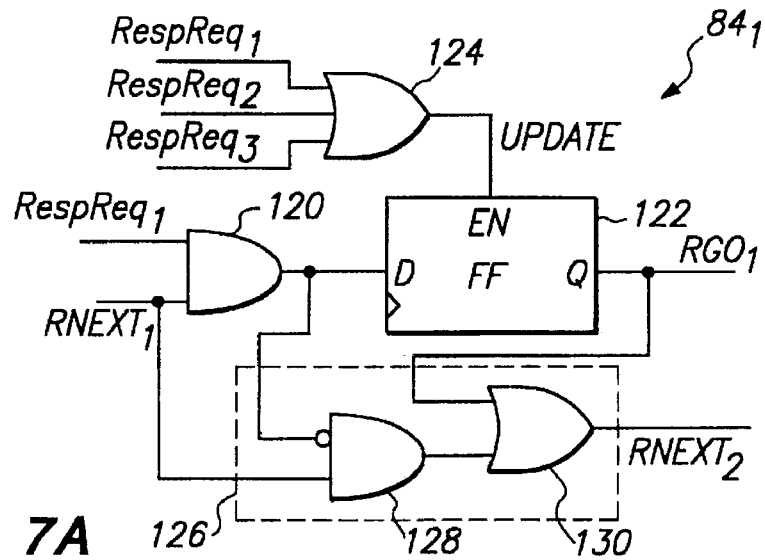
FIGS. 7a–7c are circuit diagrams of the RespReq ring components $84_1$–$84_3$, respectively.
Figure 7B:
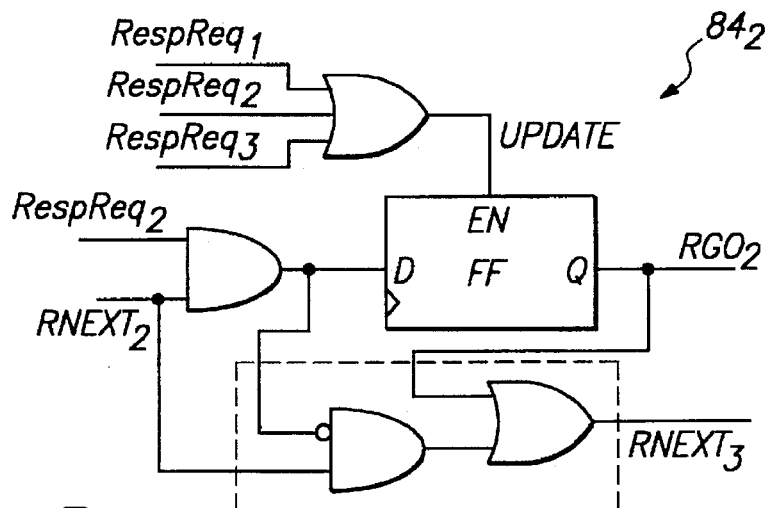
Figure 7C:
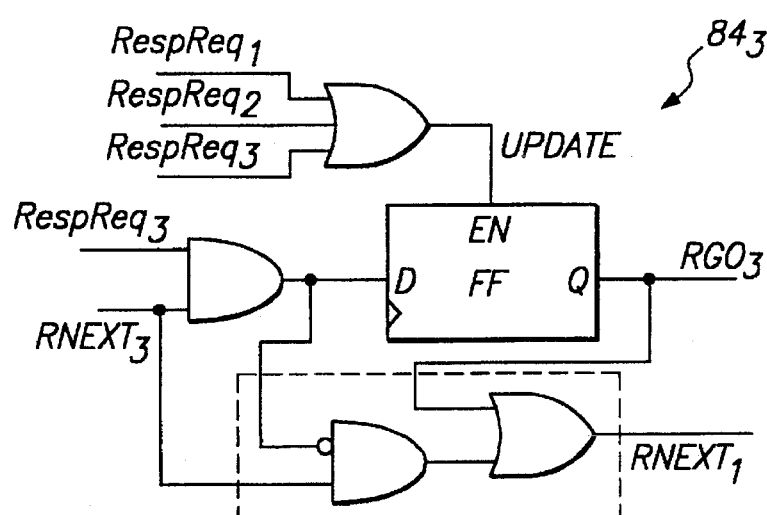
Figure 8A:
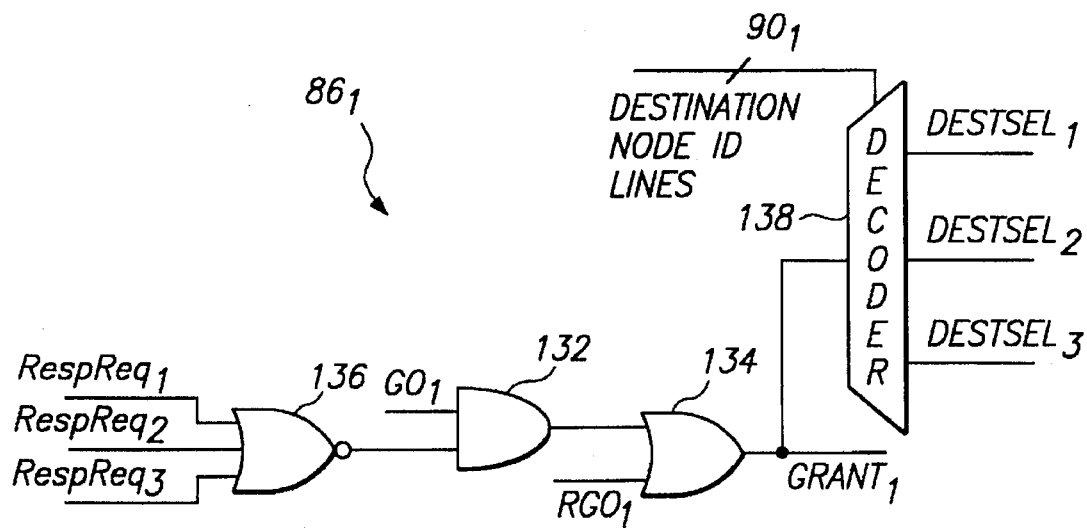
FIGS. 8a–8c are circuit diagrams for prioritizers $86_1$–$86_3$, respectively.
Figure 8B:
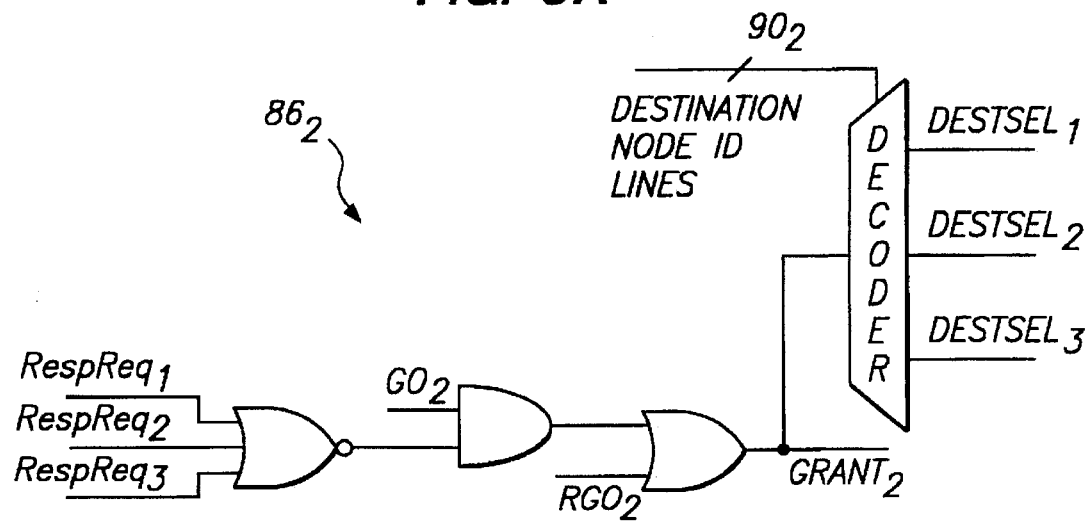
Figure 8C:
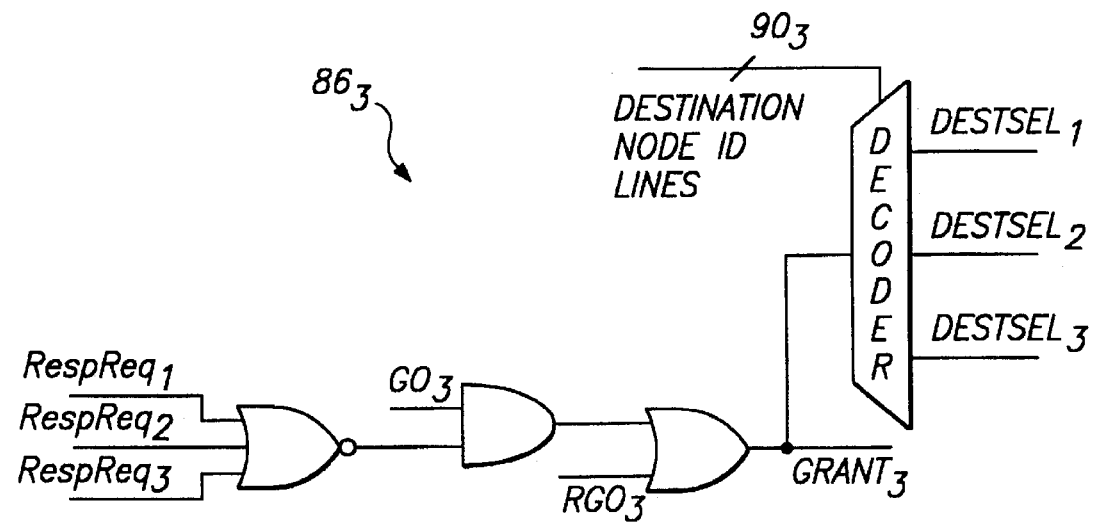

Specifically, FIGS. 6a–6c provide circuit diagrams for Req ring components $82_1$–$82_3$, respectively, FIGS. 7a–7c provide circuit diagrams for RespReq ring components $84_1$–$84_3$, respectively, and FIGS. 8a–8c provide circuit diagrams for prioritizers $86_1$–$86_3$, respectively. For the sake of simplicity, only the components for node coordinator $80_1$ will be discussed herein, but it should be noted that the discussion for coordinator $80_1$ also applies to the other node coordinators $80_2$, $80_3$ as well.

Referring now to FIG. 6a, component $82_1$, which handles the regular requests made by node 1, preferably first comprises a multiplexer 100 and an AND gate 102. MUX 100 receives the capacity signals $capacity_1$–$capacity_3$ from all of the nodes 14 at its regular inputs, and receives the destination node ID lines $90_1$ from $node_1$ at its select inputs. AND gate 102 receives as inputs the output of MUX 100 and the regular request line $Req_1$ from $node_1$. Together, these two circuit components 100, 102 operate to determine whether the information transfer requested by $node_1$ can be completed. To elaborate, each time $node_1$ makes a regular request, it sends out the ID of the destination node on lines $90_1$ and asserts the $Req_1$ line. Because MUX 100 receives all of the capacity signals, and because the ID lines $90_1$ are coupled to the select inputs of MUX 100, sending a destination node ID out on lines $90_1$ in effect causes MUX 100 to pass the capacity signal of the destination node to its output. This selected capacity signal is ANDed by gate 102 with $Req_1$, and only if both signals are asserted will the output of gate 102 be asserted. Therefore, if gate 102 has an asserted output, then it means that node $_1$ has submitted a regular request and that the specified destination node has capacity to receive information signals. In short, the requested transaction can be completed.

The output of gate 102 is coupled to an input of AND gate 104. Gate 104 further receives as input the $Next_1$ signal. The $Next_1$ signal, when asserted, indicates that $node_1$ is the next node on the regular request ring to receive control of the bus. If the transaction requested by $node_1$ can be completed and if $node_1$ is next on the regular request ring to receive control of the bus 16, then the output of gate 104 will be asserted. Thus, the output of gate 104 indicates whether control of the bus 16 should be granted next to $node_1$. The output of gate 104 is further latched into flip-flop 106. The output Q from flip-flop 106 is the $Go_1$ signal, which when asserted, indicates that $node_1$ is the next node on the regular request ring to gain control of the bus 16. Note, however, that $Go_1$ is not the bus grant signal for $node_1$. Even if $Go_1$ is asserted, the bus might still not be granted to $node_1$ immediately. Because response requests have higher priority than regular requests, $Go_1$ might be superseded by a response request. The actual bus grant signal comes from the prioritizer $86_1$.

In addition to the elements already described, component $82_1$ preferably further comprises a NOR gate 108 and a transfer circuit 110. NOR gate 108 receives the response request signals $RespReq_1$–$RespReq_3$ from all of the nodes 14 and provides an output signal Update* which is used to enable the flip-flop 106 to selectively latch in the signal at the D input of the flip-flop. The Update* signal serves to prevent the status of the regular request ring from changing when a regular request is superseded by a response request. The transfer circuit 110 controls the passing of the Next signal onto the next node. There are two circumstances in which the $Next_2$ signal will be asserted. First, $Next_2$ is asserted if $node_1$ is the next node on the regular request ring to receive control of the bus but has not made a valid request. Second, $Next_2$ is asserted if $Go_1$ is asserted. AND gate 112 and OR gate 114 implement the logic just described. If $Next_2$ is asserted, then it means that $node_2$ becomes the next node on the regular request ring to receive control of the bus 16. In other words, $node_2$ becomes the starting point for the next round of node selection. Control is thus passed from node to node on the regular request ring.

The RespReq ring component $84_1$ for the $node_1$ coordinator $80_1$ is shown in FIG. 7a, wherein the component $84_1$ preferably comprises an input AND gate 120, a flip-flop 122, an OR gate 124, and a transfer circuit 126. The AND gate 120 receives as inputs the response request line $RespReq_1$ from $node_1$ and the $RNext_1$ line. $RespReq_1$ is asserted when $node_1$ is making a response request and $RNext_1$ is asserted when $node_1$ is the next node on the response request ring due to receive control of the bus 16. If the output of AND gate 120 is asserted, then it means that $node_1$ has submitted a response request and that $node_1$ is the next node on the response request ring to receive control of the bus 16; thus, $node_1$ should receive control of the bus 16 next. The output from gate 120 is sent to the D input of flip-flop 122. Flip-flop 122 latches this signal and provides the output signal $RGo_1$, which indicates that $node_1$ should receive control of the bus 16 next. The latching of flip-flop 122 is controlled by the output of OR gate 124. Gate 124 receives as inputs the response request signals $RespReq_1$–$RespReq_3$ from all of the nodes 14 and provides as output the Update signal. The Update signal causes flip-flop 122 to latch each time any response request is received.

The transfer circuit 126 controls the passing of the $RNext_2$ signal to the next node in the response request ring. Signal $RNext_2$ is asserted if: (1) $node_1$ is the next node on the response request ring to receive control of the bus but has not made a response request; or (2) $RGo_1$ is asserted. AND gate 128 and OR gate 130 implement the logic just described. If $RNext_2$ is asserted, then it means that $node_2$ becomes the next node on the response request ring to receive control of the bus 16. Control is thus passed from node to node on the response request ring.

Notice that component $84_1$ has no means for testing the capacity signal of a destination node when processing a response request. This means that component $84_1$ allows a source node to send read response data to a destination node regardless of the status of the capacity signal of the destination node. This seems to cut against the basic principle of the present invention, but actually it is quite consistent with that principle. Recall that the source interface of a node makes sure there is sufficient capacity to receive the requested read data before launching a read request. This means that when a read request is launched, it is guaranteed that the requesting node has capacity to receive the requested data. Consequently, when component $84_1$ processes a response request, it knows that the destination node has capacity to receive the read data. Hence, there is no need to check for capacity.

The output signals $Go_1$ and $RGo_1$ from components $82_1$ and $84_1$, respectively, are received and prioritized by prioritizer $86_1$ (FIG. 8a). It is prioritizer $86_1$ which actually issues the bus grant signal $Grant_1$ to $node_1$. The bus grant signal $Grant_1$ is asserted if one of two conditions are satisfied. First, $Grant_1$ is asserted if $RGo_1$ is asserted. In other words, if $node_1$ has submitted a response request and $node_1$ is the next node on the response request ring to receive control of the bus 16, then $Grant_1$ is asserted. Second, $Grant_1$ is asserted if $Go_1$ is asserted and there have been no response requests received by any of the nodes. That is, if $node_1$ is the next node on the regular request ring which should receive control of the bus 16, and if no response requests are received, then the bus is granted to $node_1$. AND gate 132 and NOR gates 134, 136 implement the logic just described. When a bus grant signal is sent to node$_1$ to grant node$_1$ control of the bus 16, prioritizer 86$_1$ preferably also sends a destination select signal DestSel to the intended destination node to notify the node that information signals are forthcoming on the bus 16. This is preferably achieved by using a decoder 138. The destination node ID lines 90$_1$ from node$_1$ are fed to the select lines of the decoder 138 to send the DestSel signal to the proper destination node.

Note from FIGS. 8a–8c that each of the prioritizers 86$_1$ 86$_3$ sends a destination select signal DestSel$_1$–DestSel$_3$ to each of the nodes 14$_1$–14$_3$. Each node, however, is capable of receiving only one destination select signal. To prevent signal contention on the DestSel lines of each node, the bus access coordinator 12 preferably further comprises three OR gates (not shown). A first OR gate receives the DestSel$_1$ signal from each of the prioritizers 86$_1$–86$_3$, and OR's them together to provide a single DestSel$_1$ to node 14$_1$. A second OR gate receives the DestSel$_2$ signal from each of the prioritizers 86$_1$–86$_3$, and OR's them together to provide a single DestSel$_2$ to node 14$_2$, and a third OR gate receives the DestSel$_3$ signal from each of the prioritizers 86$_1$–86$_3$, and OR's them together to provide a single DestSel$_3$ to node 14$_3$. The system description is now complete.

Figure 9:
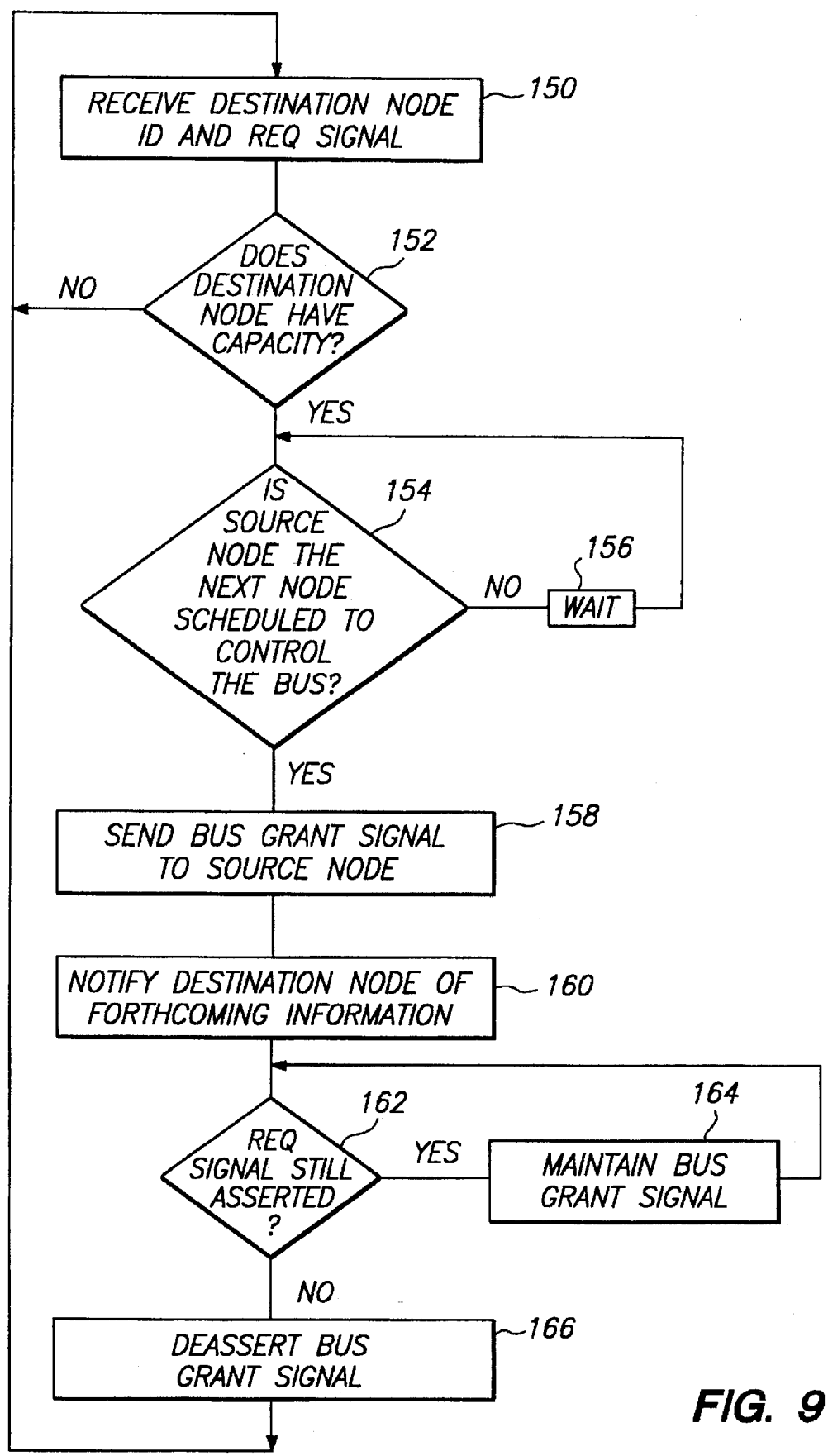
FIG. 9 is a flow diagram illustrating the steps taken in sending data from a source node to a destination node.
Figure 10:
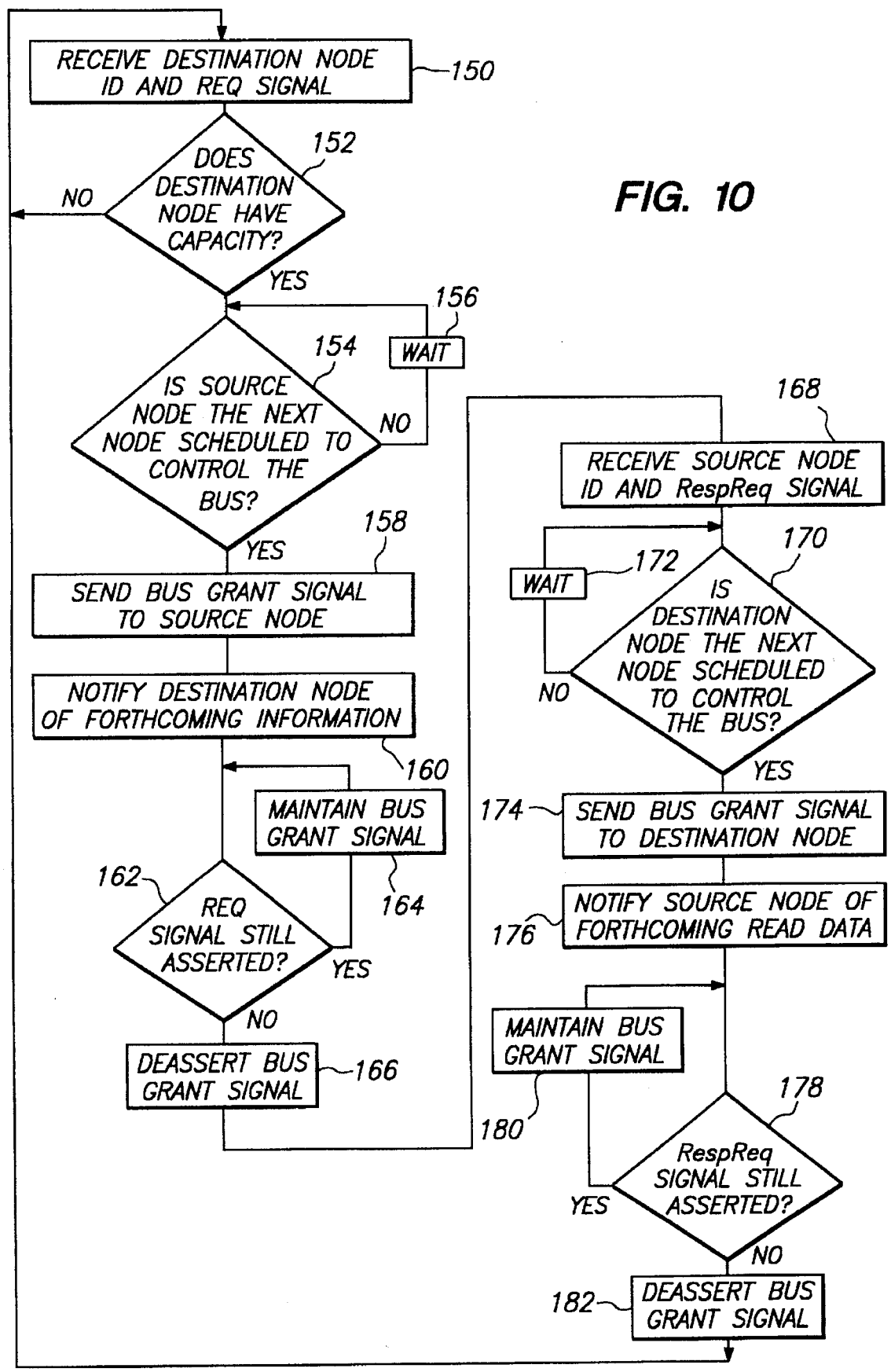
FIG. 10 is a flow diagram illustrating the steps taken in reading data from a destination node.

To illustrate the operation of system 10, reference is made to FIGS. 9 and 10. FIG. 9 shows a flow diagram of the steps taken in sending data to a node, and FIG. 10 shows a flow diagram of the steps taken in reading data from a node. With reference to FIG. 9, a write operation is processed by a node coordinator 80 by having the node coordinator receive 150 a destination node ID and a regular request signal from its corresponding node. Thereafter, the code coordinator uses the destination node ID to check 152 the status of the destination node's capacity signal. If the destination node lacks capacity, then the node coordinator loops back to receive another request. But if the destination node has sufficient capacity, then the node coordinator determines 154 whether its corresponding node is the next node scheduled to receive control of the bus 16. If not, the node coordinator waits 156 until its corresponding node is the next scheduled node. Once the corresponding node becomes the next scheduled node, the node coordinator sends 158 a bus grant signal to the corresponding node to grant the node control of the bus 16. In addition, the node coordinator sends a DestSel signal to the destination node to notify 160 the destination node that information signals are forthcoming on the bus 16. Once it has control of the bus 16, the node sends information signals (preferably in the form of a data packet) to the destination node. Thereafter, the node coordinator monitors 162 the request signal from the corresponding node. As long as the request signal remains asserted, the bus grant signal is maintained 164, but as soon as the request signal is deasserted, the bus grant signal is deasserted to take control of the bus 16 away from the corresponding node. Preferably, the node deasserts its request signal as soon as information transmission is completed without waiting for a response from the destination node. This eliminates response wait time. After deasserting the bus grant signal, the node coordinator loops back to receive another request signal.

The steps taken for reading data from a node are shown in FIG. 10. A read operation is a two part process involving two different node coordinators. In the first part, a source node sends a read request to a destination node. In the second part, the destination node responds by sending read data to the source node. The first part of the process (steps 150–166) is the same as that for writing data to a destination node; thus, these steps need not be described again here.

After the read request is sent from the source node to the destination node, the node coordinator corresponding to the source node deasserts the bus grant signal to deprive the source node of control of the bus 16. Thereafter, the node coordinator corresponding to the destination node receives 168 from the destination node the ID of the source node and a response request signal. In response to these signals, the node coordinator determines 170 whether the destination node is the next node scheduled to gain control of the bus 16. If not, the node coordinator waits 172. When the destination node becomes the next scheduled node, the node coordinator corresponding to the destination node sends 174 a bus grant signal to the destination node to grant it control of the bus 16. In addition, the node coordinator sends a DestSel signal to the source node to notify the source node that read data is forthcoming on the bus 16. Thereafter, information transfer is conducted via the bus.

Notice that in granting control of the bus to the destination node, the node coordinator corresponding to the destination node does not check the status of the source node's capacity signal. This is because the coordinator knows that the destination node is responding to a read request and that for each read request, a source node guarantees that there will be sufficient capacity to receive the requested data. Thus, checking for capacity is unnecessary. After granting the bus to the destination node, the node coordinator corresponding to the destination node checks 178 the status of the response request signal. If the response request signal remains asserted, the bus grant signal is maintained 180, but once the response request signal is deasserted, the node coordinator deasserts 182 the bus grant signal to deprive the destination node of control of the bus 16. Preferably, the destination node deasserts the response request signal as soon as the read data is transmitted without awaiting a response from the source node. The read operation is thus completed.

What is claimed is:

1. A method for coordinating access to a bus in a system having a source node, a destination node and a bus coordinator, comprising the steps of:

determining at said source node whether said source node has capacity to receive read data;

selectively sending a bus request from said source node to said bus coordinator in response to said source node determining that said source node has capacity to receive read data;

receiving said bus request at said bus coordinator, said bus request identifying a destination node;

determining at said bus coordinator whether said destination node has capacity to receive said read request;

in response to a determination that said destination node has said capacity, said bus controller selectively granting control of said bus to said source node to allow said source node to transfer said read request to said destination node;

depriving said source node of control of said bus using said bus coordinator after said read request is transferred;

receiving a response request at said bus coordinator from said destination node; and in response to receiving said response request, said bus coordinator selectively granting control of said bus to said destination node to allow said destination node to transfer read data to said source node.

2. The method of claim 1, wherein, after receiving a response request from said destination node, control of said bus is granted to said destination node without determining whether said source node has capacity to receive said read data.

3. The method of claim 1, wherein the second determining step comprises the step of:

receiving an indication at said bus coordinator that said destination node has capacity to receive a request.

4. The method of claim 1, wherein the granting step comprises the step of:

sending a bus grant control signal from said bus coordinator to said source node, said control signal remaining asserted so long as control of said bus is granted to said source node.

5. A bus system, comprising:

a bus;

a destination node coupled to said bus;

a source node coupled to said bus, said source node selectively sending a read request to said destination node in response to said source node determining that said source node has capacity to receive read data and in response to said source node having access to said bus; and a bus coordinator coupled to said source node and said destination node, said coordinator receiving a bus request from said source node and determining whether said destination node has capacity to receive a request, and, in response to a determination that said destination node has said capacity, said coordinator granting control of said bus to said source node to allow said source node to send a read request to said destination node, said coordinator thereafter depriving said source node of control of said bus, and receiving a response request from said destination node, and in response to said response request, said coordinator selectively granting control of said bus to said destination node to allow said destination node to transfer read data to said source node.

6. The system of claim 5, wherein said coordinator grants control of said bus to said destination node without determining whether said source node has capacity to receive said read data.

7. The method of claim 1, further comprising, while said source node is waiting for said read data, the steps of:

determining at said bus coordinator whether said source node has capacity to receive information in addition to said read data; and in response to a determination that said source node has said capacity to receive information in addition to said read data, said bus coordinator selectively allowing said information to be transferred to said source node.

8. The method of claim 7, wherein determining whether said source node has capacity to receive said information comprises the step of:

receiving an indication at said bus coordinator that said source node has capacity to receive said information.

9. The system of claim 5, wherein, while said source node waits for said read data, said coordinator further determines whether said source node has capacity to receive information in addition to said read data.

10. The system of claim 9, wherein, in response to a determination that said source node has said capacity, said coordinator allowing said information to be transferred to said source node while said source node waits for said read data.

* * * * *